(12) United States Patent
Bates et al.

(10) Patent No.: US 11,318,868 B1
(45) Date of Patent: May 3, 2022

(54) SIDE-IMPACT CRASH STRUCTURE FOR A VEHICLE SEAT

(71) Applicant: Zoox, Inc., Foster City, CA (US)

(72) Inventors: Mark Alan Bates, Kenilworth (GB); Solomon Andrew Hafer, Reno, NV (US); Mikael Jarsaeter, Burlingame, CA (US); Markus Jost, San Mateo, CA (US); David Maurice Libeaut, Bidford-on-Avon (GB); Andrew Frank Raczkowski, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/112,358

(22) Filed: Dec. 4, 2020

(51) Int. Cl.
*B60N 2/42* (2006.01)
*B62D 21/15* (2006.01)
*B60N 2/90* (2018.01)
*B60N 2/427* (2006.01)

(52) U.S. Cl.
CPC ....... *B60N 2/4235* (2013.01); *B60N 2/42727* (2013.01); *B60N 2/986* (2018.02); *B62D 21/157* (2013.01)

(58) Field of Classification Search
CPC .. B60N 2/4235; B60N 2/986; B60N 2/42727; B60N 2/42745; B62D 21/157
USPC ................................ 297/216.13; 296/187.12
See application file for complete search history.

(56) References Cited

U.S. PATENT DOCUMENTS

| | | | | |
|---|---|---|---|---|
| 4,170,380 A * | 10/1979 | Raitport | ............... | B60N 2/4221 296/68.1 X |
| 4,231,607 A * | 11/1980 | Bohlin | ................ | B60N 2/4235 296/63 |
| 4,272,103 A * | 6/1981 | Schmid | ............... | B62D 21/157 296/187.12 X |
| 4,512,604 A * | 4/1985 | Maeda | ................ | B60N 2/4235 297/216.13 X |
| 5,000,509 A * | 3/1991 | Sinnhuber | .............. | B60J 5/0451 296/187.12 X |
| 5,102,163 A * | 4/1992 | Ishikawa | ................ | B60R 7/046 296/187.05 |
| 5,306,066 A * | 4/1994 | Saathoff | ................ | B60J 5/0451 296/187.12 X |
| 5,395,135 A * | 3/1995 | Lim | ...................... | B60J 5/0451 296/187.12 X |
| 5,482,344 A * | 1/1996 | Walker | ................ | B60R 21/0428 296/146.7 |
| 5,671,968 A * | 9/1997 | Masuda | ............... | B62D 25/025 296/187.12 X |
| 6,142,563 A * | 11/2000 | Townsend | ............ | B60N 2/4228 297/216.1 |
| 6,851,740 B1 * | 2/2005 | Peng | .................... | B62D 21/157 296/187.12 X |

(Continued)

*Primary Examiner* — Rodney B White
(74) *Attorney, Agent, or Firm* — Lee & Hayes, P.C.

(57) ABSTRACT

A side-impact crash structure for a vehicle seat may be positioned in the side wall of a passenger seat to reduce impact forces imparted to an occupant during a side collision. The side-impact crash structure for the vehicle seat may include energy absorbers positioned between the seating surface and the outer sidewall of the vehicle. The energy absorbers may be positioned to engage the shoulder and/or lower abdomen area of the passenger. The energy absorbers may be configured to absorb impact forces over a limited ride-down distance (the distance over which the deceleration occurs) to prevent injury to occupants.

20 Claims, 14 Drawing Sheets

(56) References Cited

U.S. PATENT DOCUMENTS

| | | | |
|---|---|---|---|
| 6,955,391 B1* | 10/2005 | Peng | B60R 21/0428 |
| | | | 296/187.12 X |
| 7,357,444 B2* | 4/2008 | Cowelchuk | B60R 21/0428 |
| | | | 296/146.7 |
| 7,387,327 B2* | 6/2008 | Tencer | B60N 2/062 |
| | | | 296/187.12 X |
| 7,537,273 B2* | 5/2009 | Lassl | B62D 21/15 |
| | | | 296/187.12 |
| 7,854,470 B2* | 12/2010 | Yamaki | B62D 21/157 |
| | | | 296/187.12 |
| 8,132,852 B2* | 3/2012 | Yamaki | B60N 2/4235 |
| | | | 296/187.08 |
| 8,366,146 B2* | 2/2013 | Yamaki | B60N 2/68 |
| | | | 297/216.13 X |
| 8,708,390 B2* | 4/2014 | Kurogi | B62D 25/088 |
| | | | 296/205 |
| 9,238,484 B2* | 1/2016 | Jenkins | B60J 5/0451 |
| 9,327,622 B2* | 5/2016 | Ikeda | B60N 2/68 |
| 2005/0161921 A1* | 7/2005 | Higuchi | B60N 2/986 |
| | | | 280/735 |
| 2006/0202513 A1* | 9/2006 | Matsuda | B60N 2/42736 |
| | | | 296/187.12 |
| 2007/0063542 A1* | 3/2007 | Fong | B60N 2/42763 |
| | | | 296/187.03 |
| 2009/0021061 A1* | 1/2009 | Yamaki | B60N 2/4235 |
| | | | 297/216.13 |
| 2009/0284041 A1* | 11/2009 | Hall | B60J 5/0452 |
| | | | 296/146.6 |
| 2017/0217351 A1* | 8/2017 | Jaradi | B60N 3/063 |
| 2019/0193665 A1* | 6/2019 | Jimenez | B60R 21/2338 |
| 2020/0094772 A1* | 3/2020 | Markusic | B60N 2/42727 |
| 2020/0307496 A1* | 10/2020 | Jimenez | B60R 21/23138 |
| 2020/0377052 A1* | 12/2020 | Youssef-Agha | B60R 21/214 |
| 2020/0384939 A1* | 12/2020 | Rutgersson | B60R 21/216 |
| 2020/0391688 A1* | 12/2020 | Schroeder | B60R 21/233 |
| 2020/0391691 A1* | 12/2020 | Fischer | B60R 21/207 |
| 2021/0179179 A1* | 6/2021 | Butukuri | B62D 21/157 |

* cited by examiner

SIDE-IMPACT CRASH STRUCTURE FOR A VEHICLE SEAT

BACKGROUND

Traditional vehicles are designed to provide protection to passengers during side-impact collisions. In a traditional passenger vehicle, where all occupants face in the direction of forward motion of the vehicle, there are several structures that protect an occupant during a side-impact crash, including front and side airbags. These structures generally absorb energy produced by a side impact. In a vehicle with a carriage seating configuration where occupants face toward one another and the seats are positioned at the proximate ends of the vehicle, the vehicle design may not accommodate appropriately positioned airbags to protect a passenger in a side impact.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
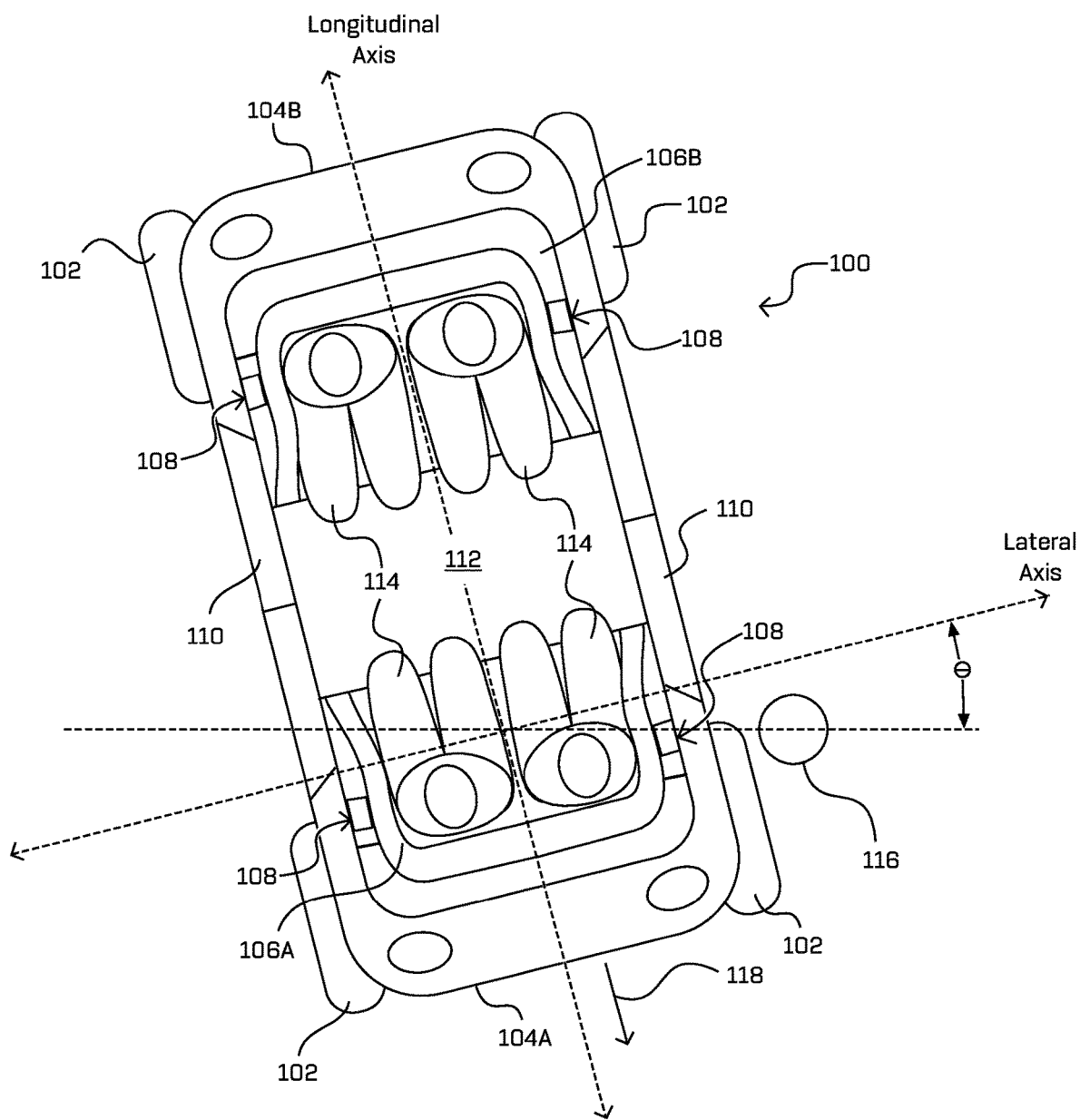
FIG. 1 is an overhead view of an example vehicle having a side-impact crash structure for a vehicle seat.

As mentioned above, occupants of a vehicle with a carriage-seating configuration are not positioned near traditional side-impact crash structures such as the front or side airbags. Due to the carriage-seating configuration, there may be no structure directly in front of the passenger in which front airbags can be installed. Additionally, there may be limited space between the passenger seating surface and the outer wall of the vehicle body in which to install side airbags.

Vehicles undergo rigorous safety tests to help ensure the safety of occupants in a crash. One such test is a side-impact crash test, FMVSS 214 Dynamic Side Impact Protection—Rigid Pole Side Impact Test. In this example side-impact crash test, the vehicle is struck by a rigid pole when traveling around 32 kph at around 75° to the vehicle's longitudinal axis. The pole is configured to strike the vehicle proximate the center of gravity of the vehicle occupant's head. In a vehicle with a traditional seating configuration, the pole strikes the middle portion of the vehicle in proximity to structures such as the door frame which may contain side airbags. In a vehicle with a carriage-seating configuration, the car may strike proximate an end of the vehicle, beyond the longitudinal end of the door frame.

This application relates to a side-impact crash structure for a vehicle seat configured to be positioned within or behind the sidewall of a vehicle seat to reduce and appropriately direct the force absorbed by an occupant during a side collision. The side-impact crash structure may include energy absorbers positioned in between the surface of the seat in which the passenger sits and the outer wall of the seat or vehicle. In some examples, the energy absorbers are positioned to couple with the abdomen and shoulder areas of a passenger during a side impact. The energy absorbers can be configured to minimize the force applied to an occupant with a limited ride-down distance (the distance over which the deceleration occurs) to prevent damage to the occupant, particularly in the vulnerable area around the occupant's ribs. The energy absorbers can be configured to plastically deform under a compressive force. As described herein, such energy absorbers may be designed based on particular geometric configurations, compositions of materials, or combinations thereof to promote such deformations. In at least some examples, such energy absorbers may be integrally formed and comprise a single member.

In some examples, the side-impact crash structure may be used on a vehicle that is bidirectional (i.e., where both longitudinal ends of the vehicle may be the leading end of the vehicle depending on the direction of travel). A bidirectional vehicle may have side-impact crash structures positioned in seats at one or both ends of the vehicle.

In some examples, the energy absorbers are formed from a plastically deformable material such as aluminum, steel, or other metals, carbon fiber, polymers, plastics, foams, or combinations of the foregoing. In some examples, the energy absorbers include an outer wall. The outer wall can be divided into multiple cells by one or more webs. The cells of the energy absorber can form a variety of shapes including a square, rectangle, triangle, hexagon, octagon, or trapezoid. In some examples, the cells can form an open-cell or honeycomb structure. The open cell construction allows the energy absorber to crush or otherwise deform, thereby absorbing energy of the collision, while minimizing intrusion on the occupant. In other examples, the energy absorber includes one or more ribs that extend away from the side of the seat. The ribs are configured to crumple in response to a force.

In some examples, the energy absorber may be formed by extrusion. The energy absorbers can also be formed using other manufacturing processes including, for example, casting, injection molding, three-dimensional printing (or other additive manufacturing techniques), or machining. Energy absorbers may have wall thicknesses and/or rib thicknesses that vary along the length of the energy absorber. For example, the thickness of the walls or ribs of the energy absorber may be thicker at the proximal end of the energy absorber than at the distal end of the energy absorber. This may allow the energy absorber to provide varying resistance or energy absorption over the distance that it deforms. For instance, the energy absorber may be configured so that the thinner portion of the energy absorber deforms relatively easily at first and progressively increases as the deformation increases. This may minimize the forces experienced by the occupant during lower impact collisions while allowing the energy absorber to absorb more energy later in the crash pulse.

While this application describes examples in which the side-impact crash structure for a vehicle seat is applied to a bidirectional autonomous vehicle, this application is not limited to bidirectional vehicles or autonomous vehicles. The side-impact crash structure described in this application can be applied to other non-bidirectional and/or non-autonomous vehicles. The vehicle may be powered by one or more internal combustion engines, electric motors powered by one or more power supplies (e.g., batteries, hydrogen fuel cells, etc.), or any combination thereof. The vehicle in this application is depicted as having four wheels/tires. However, other types and configurations of vehicles are contemplated, such as, for example, vans, sport utility vehicles, crossover vehicles, trucks, buses, agricultural vehicles, construction vehicles, and trains vehicles. While this application describes and depicts a side-impact crash structure for a vehicle seat positioned on a seat at or near the end of the vehicle, the side-impact crash structure described in this application can be on a seat positioned anywhere along the length of the vehicle. While this application describes and depicts a vehicle having a carriage-seating arrangement, the side-impact crash structure disclosed can be applied to vehicles having different seating arrangements, including where all passengers face the direction of forward motion of the vehicle, where all passengers face opposite the direction of forward motion, and/or where one or more passengers face a lateral side of the vehicle.

The techniques and systems described herein may be implemented in a number of ways. Example implementations are provided below with reference to the figures.

Figure 2A:
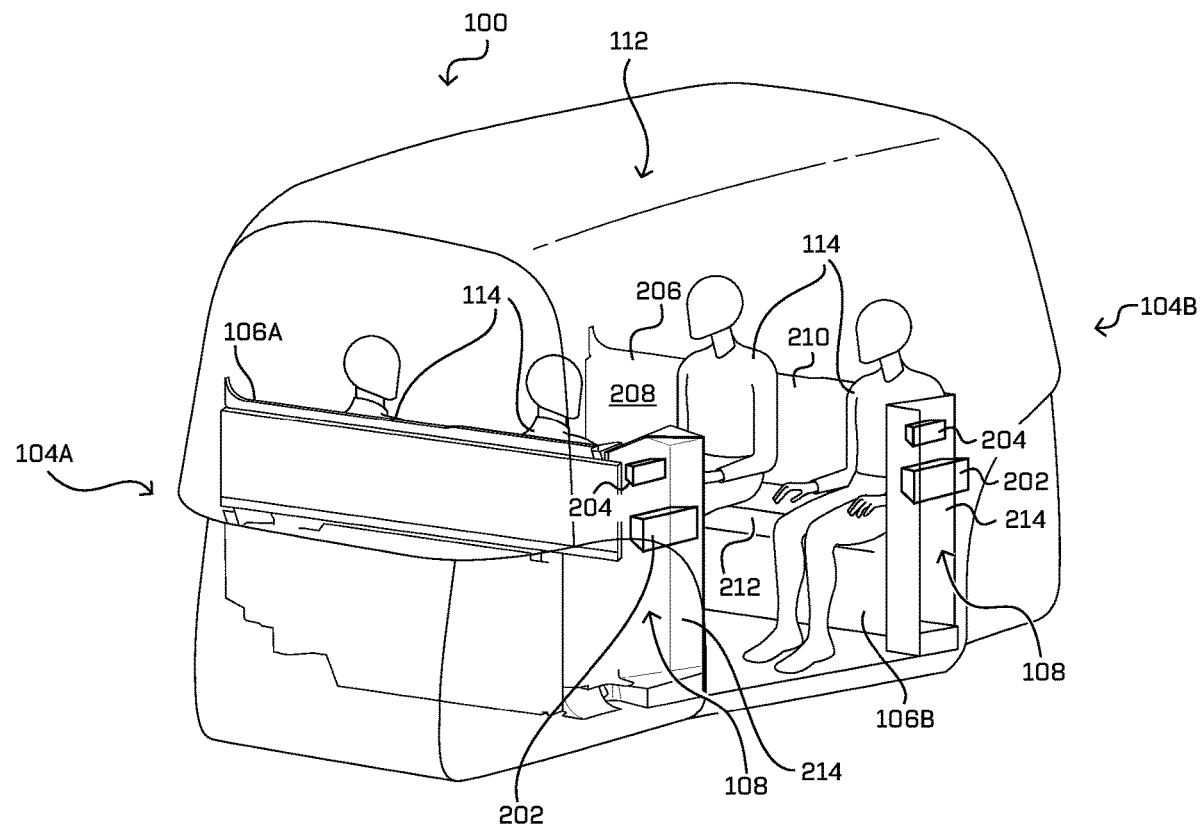
FIG. 2A is a perspective view of an example vehicle having a side-impact crash structure for a vehicle seat.

FIGS. 1 and 2A depict an example vehicle 100 having a longitudinal axis generally aligned with a direction of travel when the vehicle is traveling straight (not turning) and a lateral axis perpendicular to the longitudinal axis. As shown the vehicle 100 includes four wheels 102 with two wheels/tires positioned at each longitudinal end 104 of the vehicle 100. The vehicle 100 may include doors 110 positioned proximate the center of the length of the vehicle. The doors 110 may be surrounded by door pillars or frames. The vehicle includes a passenger compartment 112 including one or more seats 106. The vehicle 100 includes a side-impact crash structure 108 that is configured to provide protection to occupants 114 in the vehicle 100 from a side impact where the point of impact is proximate the vehicle seat 106.

In some examples, the passenger compartment 112 of the vehicle includes two seats 106, including a first seat 106A and a second seat 106B, oriented facing one another (e.g. a "carriage seating" configuration). In other examples, any number of one or more seats may be disposed in a vehicle at locations and/or orientations other than what is indicated in FIGS. 1 and 2A. For instance, though illustrated as two bench style seats 106 which can accommodate multiple occupants 114, in some examples, multiple individual bucket-style seats may be disposed in a vehicle. An occupant(s) 114 in the first seat 106A may be positioned by the first seat to face an occupant(s) in the second seat 106B. When in this configuration, the occupants' 114 shoulders and abdomen may be positioned in proximity to the outer corners of the passenger compartment 112. The side-impact crash structure 108 is configured to protect the occupants 114 in this position.

In some examples, because of the bidirectionality of the vehicle 100, each of the first seat 106A and the second seat 106B may, at different times, be a leading or trailing seat, as determined by the direction of travel of the vehicle. Also, each of the first seat 106A and second seat 106B may, at different times, be a forward-facing seat or a rear-facing seat, as determined by direction of travel of the vehicle 100. Therefore, the seats of bidirectional vehicles may include a side-impact crash structure 108 proximate both the first longitudinal end 104A and second longitudinal end 104B of the vehicle to protect occupants in both the first seat 106A and the second seat 106B in side-impact crash scenarios. In other examples, the vehicle 100 may include a side-impact crash structure 108 on only one longitudinal end 104 of the vehicle 100. Also, the side-impact crash structure 108 can be positioned on one or more seats 106 of a vehicle that is not bidirectional.

FIG. 1 depicts an example side-impact collision between the vehicle and a pole 116. The pole 116 in FIG. 1 shows an example side-impact position that the side-impact crash structure is configured to protect against. In this example, the vehicle 100 is traveling in the direction of arrow 118, making longitudinal end 104A the leading end (or "front") of the vehicle in this example. The pole 116 depicts an impact to the leading, left corner of the vehicle 100 in the vicinity of or slightly behind a wheel 102 of the vehicle 100. The side-impact crash structures 108 may include energy absorbing structures (described with reference to FIGS. 2 and 3A-3C) positioned to receive an impact force from a direction toward the front corner of the vehicle (like the angle of impact of the pole 116 in this example). In some examples, the energy absorbing structures may be disposed on the both sides of each vehicle seat 106.

FIG. 2A is a perspective view of the vehicle 100 showing the side-impact crash structure 108 positioned proximate the side of the seat 106 of the vehicle 100. FIG. 2 shows one lateral side of the vehicle 100. It is understood that the opposite lateral side of the vehicle 100 may be a mirror image with similar structures. The wheels are omitted from the vehicle in this drawing to better illustrate the crash structure. Additionally, the first longitudinal end 104A is shown transparent to illustrate the locations of the crash structure 108 relative to the passenger compartment 112. The seat 106 of the vehicle generally includes a seat body 206 that forms a seating surface 208 having a seat back 210, a seat bottom 212, and at least one seat side 214. The seat surface 208 is configured to engage and support an occupant 114 of the vehicle. The seat body 206 can be a unitary structure or a series of structures coupled together to form the seat body shape. The seat body 206 can be a solid structure or include a hollow or partially hollow interior bounded by an outer shell 207. The seat body 206 is generally formed from a rigid material including a plastic or carbon fiber material. A soft or cushioning material may be attached to the seating surface 208 of the seat body 206 to provide comfort to the occupant 114. The comfort material may be enclosed in a durable cover. The side-impact crash structure 108 may include energy absorbers 202, 204 positioned on lateral sides 214 of the seat body 206.

In the example shown in FIG. 2A, the crash structure 108 includes a first energy absorber 202 and a second energy absorber 204 positioned behind the seat surface 208 of the vehicle seat such that the seat surface 208 is positioned in between the energy absorbers 202, 204 and the occupant 114. The energy absorbers 202, 204 are generally positioned between the seat surface 208 and the outer wall of the passenger compartment 110. In some examples, the energy absorbers are not coupled directly to the outer wall of the passenger compartment or the frame of the vehicle. The energy absorbers 202, 204 of FIG. 2 are positioned on the lateral side 214 of the seat body 206. In other examples, one or more of the energy absorbers 202, 204 can be positioned elsewhere on the seat body 206 including the seat back 210 or an area of transition between the seat back 210 and the seat side 214. In an example, the energy absorbers 202, 204 are positioned within the seat body. The energy absorbers 202, 204 may be integrally formed in the seat bod 206. In some examples, the side-impact crash structure 108 includes only one energy absorber. In other examples, the side-impact crash structure 108 includes multiple energy absorbers positioned on the lateral sides 214 and/or back 210 of the seat body 206. In some examples, the side-impact crash structure 108 includes at least one energy absorber 202, 204 on each lateral side 214 of each vehicle seat 106. In other examples, the side-impact crash structure 108 may include energy absorbers 202, 204 on only one lateral side 214 of the vehicle seat 106. The energy absorber(s) 202, 204 may be positioned to receive and absorb a side impact that is in the direction of the center-of-gravity of the head of an occupant 114 of the vehicle.

Figure 2B:
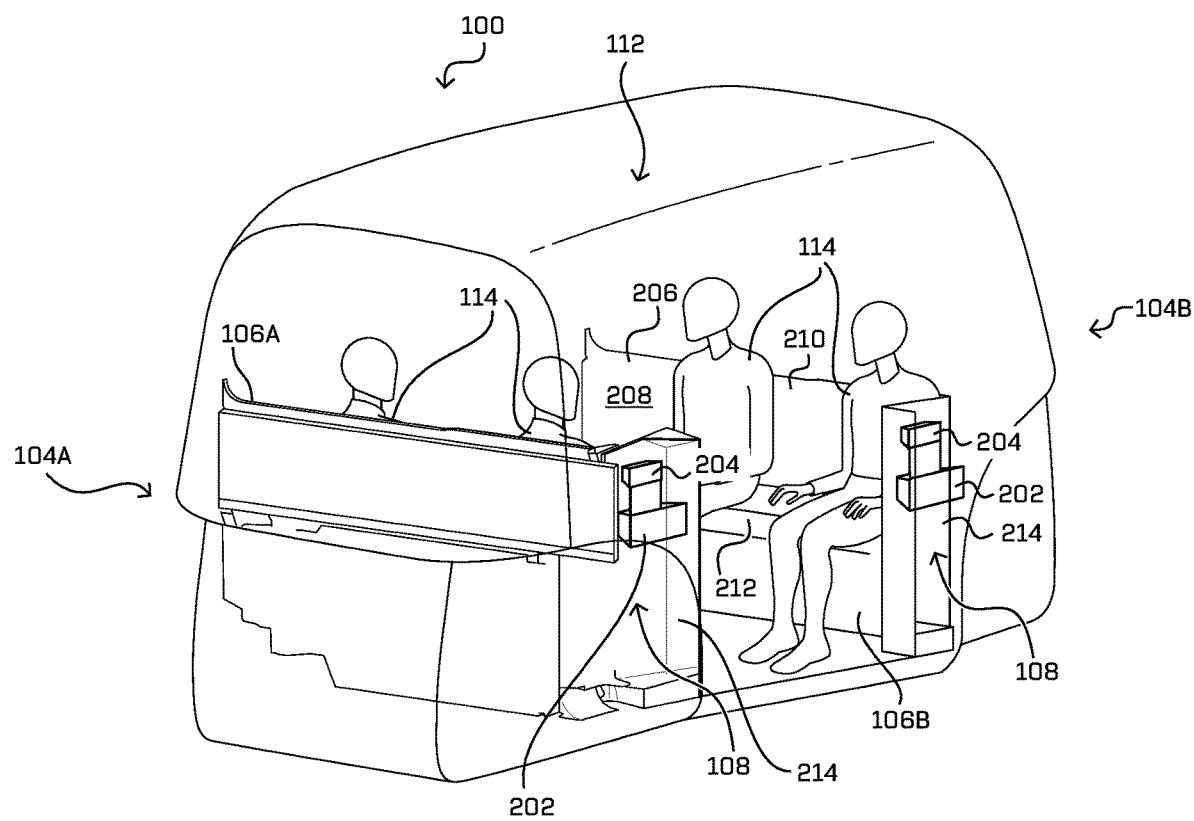
FIG. 2B is a perspective view of another example vehicle having a side-impact crash structure for a vehicle seat.

In another example, shown in FIG. 2B, the crash structure 108' is a unitary structure positioned on the lateral side 214 of the seat body 206. The crash structure 108' comprises a first energy absorbing portion 202' coupled directly to a second energy absorbing portion 204'. In the depicted example, the first energy absorbing portion 202' and the second energy absorbing portion 204' are connected by a connecting strip or rod 216. In other examples, the first and second energy absorbing portions 202', 204' can be connected by any shaped connecting structure. The first and second energy absorbing portions 202', 204' have the same structure and position as the energy absorbers 202, 204 described above. The energy absorbing portions 202', 204' may be connected by a structure that extends substantially vertically from the first energy absorbing portion 202' to the second energy absorbing portion 204'. The connector may be substantially rigid or collapsible.

Figure 3A:
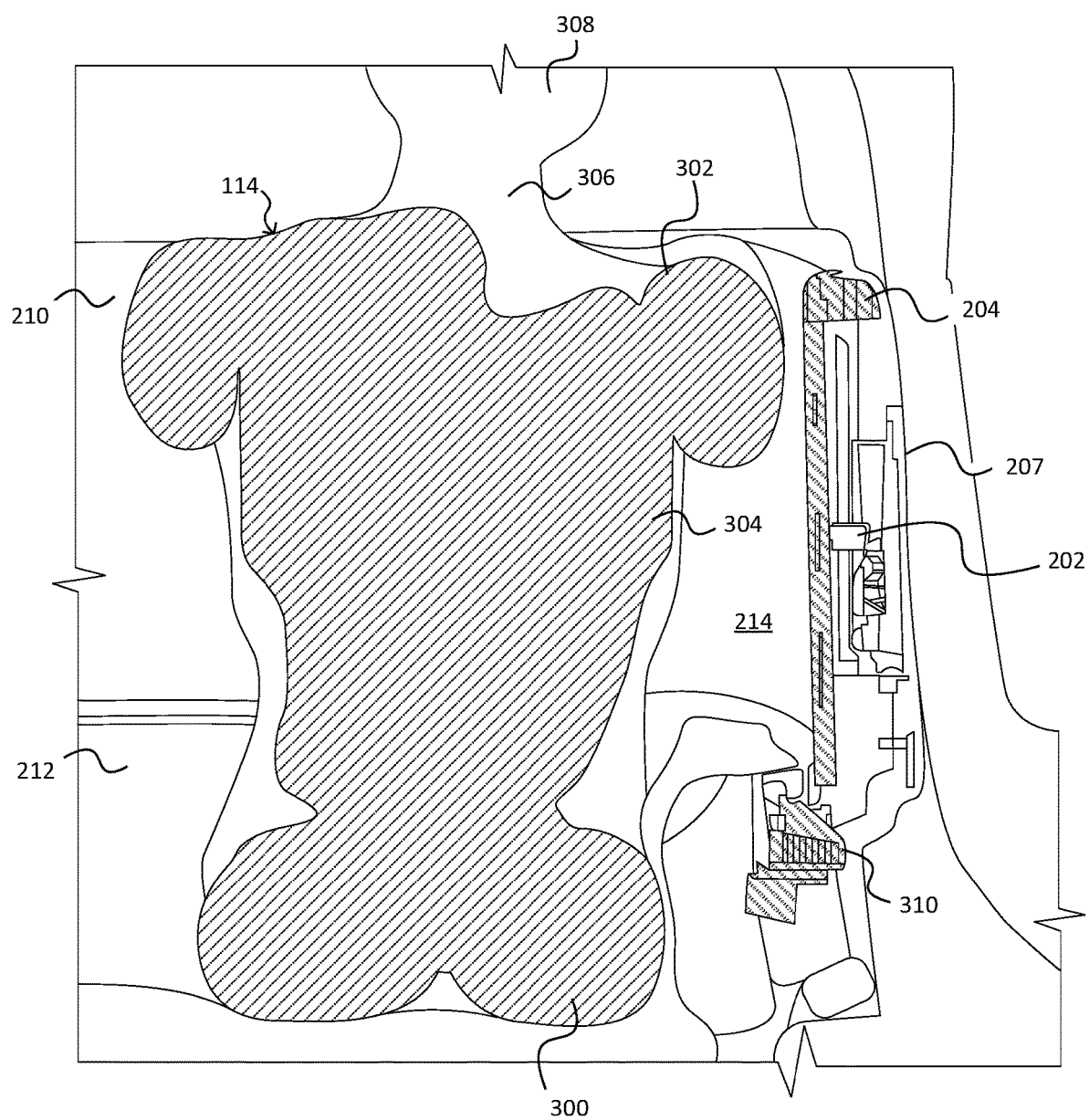
FIG. 3A is a schematic side view of an example vehicle having a side-impact crash structure for a vehicle seat.
Figure 3B:
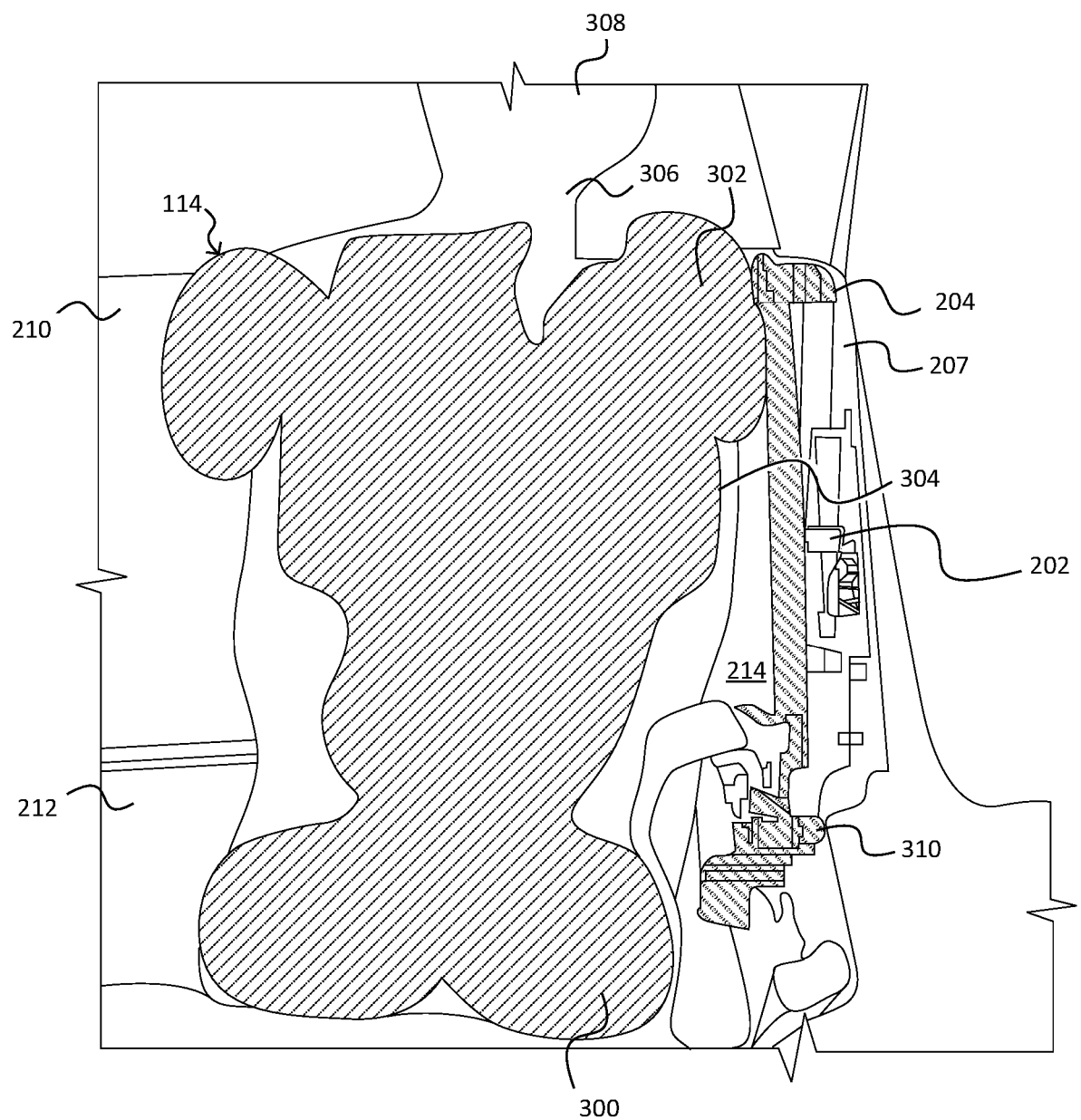
FIG. 3B is a schematic side view showing deformation of an example side-impact crash structure for a vehicle seat during a collision.
Figure 3C:
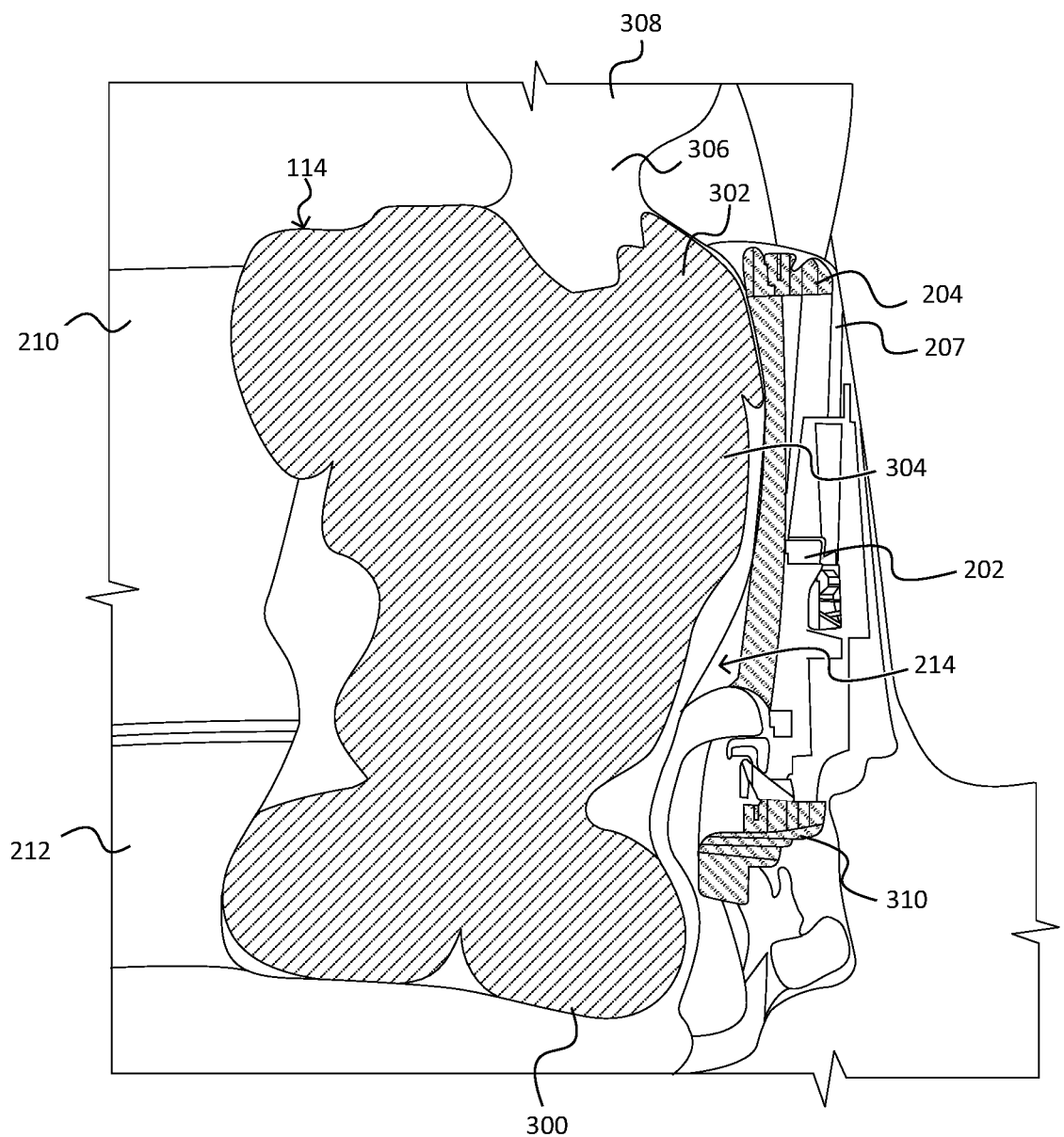
FIG. 3C is a schematic side view showing deformation of an example side-impact crash structure for a vehicle seat during a collision.

FIGS. 3A-3C is a schematic side view of the side-impact crash structure 108 subject to forces from a side impact. FIGS. 3A-3C show an occupant 114 positioned on one lateral side of a vehicle seat 106. It should be understood that a mirror image of this structure may appear on the opposite lateral side of the seat 106. Additionally, the structures shown in FIGS. 3A-3C may appear in multiple seats 106 of the vehicle 100. As described above, the side-impact crash structure 108 may include energy absorbers 202, 204 positioned on the sides 214 of the seat 106 of the vehicle 100. The energy absorbers 202, 204 are configured to deform in response to a compressive force, discussed in further detail below. As shown in FIG. 3A, the energy absorbers 202, 204 are coupled the seat body 206 on its lateral side 214. In some examples, the first energy absorber 202 may be positioned to generally align with lower abdomen area 300 below the rib cage 304 of an occupant 114 positioned on the seating surface 208 proximate the lateral side 214. The second energy absorber 204 may be positioned to generally align with the shoulder area 302 of an occupant 114 positioned on the seating surface 208 proximate the lateral side. In some examples, the first energy absorber 202 is positioned on the lateral side 214 of the seat body 206 at a distance of about 100 mm to about 300 mm above the seat bottom 212. In other examples, the first energy absorber 202 is positioned on the lateral side 214 of the seat body 206 at a distance of about 150 mm to about 200 mm above the seat bottom 212. In another example, the first energy absorber 202 is positioned on the lateral side 214 of the seat body 206 at a distance of about 200 mm above the seat bottom 212. In some examples, the second energy absorber 204 is positioned on the lateral side 214 of the seat body 206 at a distance of about 450 mm to about 750 mm above the seat bottom 212. In other examples, the second energy absorber 204 is positioned on the lateral side 214 of the seat body 206 at a distance of about 500 mm to about 650 mm above the seat bottom 212. In another example, the second energy absorber 204 is positioned on the lateral side 214 of the seat body 206 at a distance of about 550 mm to about 600 mm above the seat bottom 212. In some examples, the height of one or more of the energy absorbers 202, 204 relative to the seat bottom 212 may be adjustable to accommodate the anatomy of a passenger.

In some examples, the second energy absorber 204 is positioned directly above the first energy absorber 202. In other examples, the position of the second energy absorber 204 may be offset from the first energy absorber 202 in a direction parallel to the direction of travel of the vehicle 100. The position of the second energy absorber 204 may also be offset from the first energy absorber 202 in a direction perpendicular to the direction of travel of the vehicle 100. In some examples, the seat body 206, including the seat sidewall 214 act as a load spreader. The energy absorber(s) 202, 204 may be coupled directly or indirectly to the seat body 206. Impact force that is not absorbed by the energy absorber(s) 202, 204 may be transferred to the seat body 206. The outer walls of the passenger compartment 112 may also act as a load spreader. The energy absorber(s) 202, 204 may be coupled directly or indirectly to the outer wall of the passenger compartment 112. Impact force that tis not absorbed by the energy absorber(s) 202, 204 may be transferred to the outer wall of the passenger compartment.

FIGS. 3B and 3C are side schematic views of the side-impact crash structure 108 as it is deformed or crushed under a compressive force. When there is an impact on the lateral side of the vehicle such that there is intrusion into the passenger compartment 112, the first energy absorber 202 can engage or couple with the abdomen area 300 of an occupant 112 seated on the seating surface 206 adjacent to the seat side 214. During the impact, the second energy absorber 204 can engage or couple with the shoulder area 302 of the occupant 114. By plastically deforming, the energy absorbers 202, 204 can reduce the amount of force transferred to the occupant during a side impact collision. The energy absorbers 202, 204 are positioned to couple with the lower abdomen 300 and shoulders 302, which are stronger points on the human anatomy than the ribs 304, neck 306, and head 308. Therefore, the energy absorbers 202, 204 are designed and positioned to lessen the impact force imparted to the occupant 114 and direct that impact force to the lower abdomen 300 and shoulders 302 of the occupant. Ribs 304 are particularly vulnerable to side impact forces as such forces may cause a rib to fracture or deform which may cause internal damage to the organs of the occupant 114. The lower abdomen 300 and shoulders 302 of occupant 114 may be able to withstand greater side impact forces without such harmful results.

The side impact crash structure can also include an airbag 310 positioned below the first energy absorber 202 on the lateral side 214 of the seat. The airbag 310 can be positioned to engage with the hip 312 portion of the passenger. In some examples, the airbag 310 is sized to only engage with the hip 312 portion of the passenger and not engage with the lower abdomen 300 area. In other examples, both the airbag 310 and first energy absorber 202 can engage the lower abdomen 300 of the passenger. In other examples, the side impact crash structure can include an airbag 310 sized and positioned to engage the hips 312 and lower abdomen 300 of the passenger and not include a first energy absorber 202. Example designs of airbags are explained in United States Patent Application Publication No. US 2020/0094771, which is hereby incorporated by reference.

Figure 4:
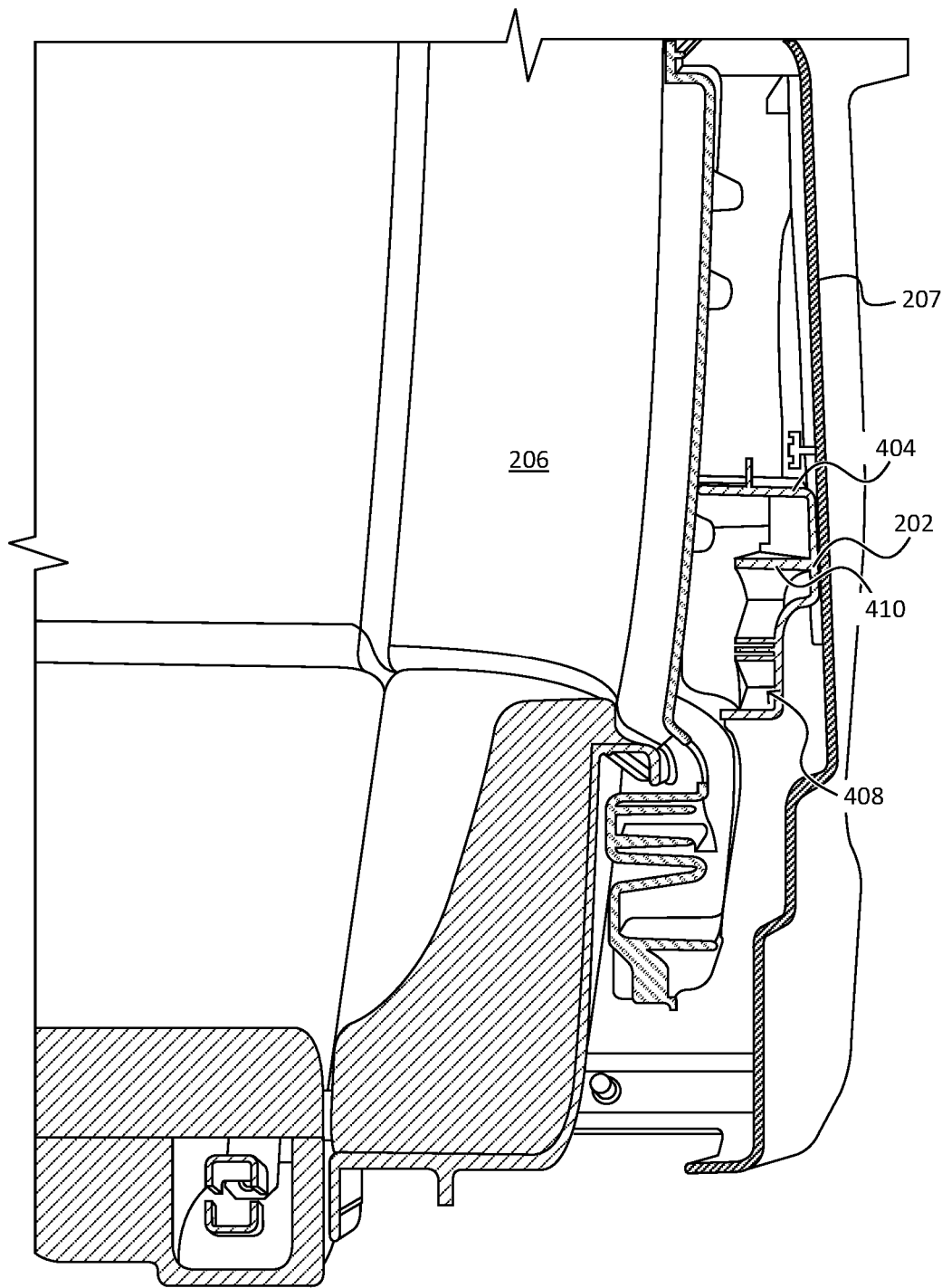
FIG. 4 is a schematic side view of an example energy absorber for a side-impact crash structure for a vehicle seat.
Figure 5:
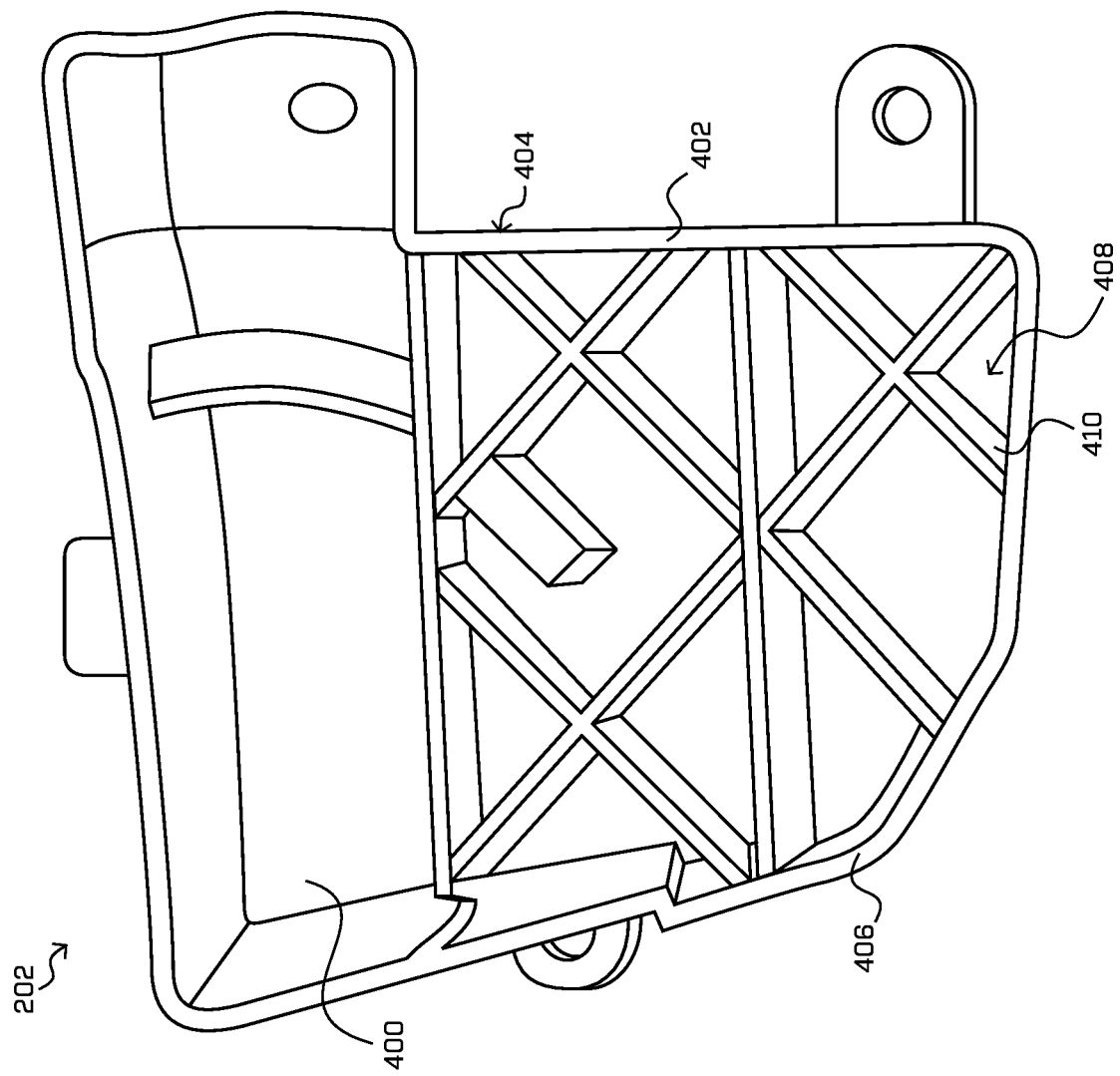
FIG. 5 is a side view of the energy absorber of FIG. 4.

(As shown in FIG. 4, the energy absorber 202 is coupled to the seat body 206 of a vehicle 100, while in FIG. 5, the energy absorber 202 is shown on its own. In some examples, the energy absorber 202 includes an inboard base 400 that is proximal and attached to a portion of the seat body 206 or vehicle, an outboard edge 402 that is distal from the vehicle, and an outer wall 404. The outer wall 404 may comprise a circumferential wall that bounds a perimeter of the energy absorber 202. The energy absorber 202 may be formed from a plastically deformable material such as aluminum, steel, other deformable metals, carbon fiber, a polymer, plastic, or foam, or a combination thereof. Depending on the material, the energy absorber can be made by extrusion, casting, injection molding, three-dimensional printing, machining, combinations of the foregoing, or other manufacturing techniques. In some examples, the energy absorber 202 is formed from extruded aluminum such as A356 Alloy aluminum.

In some examples, as best shown in FIG. 5, the energy absorber 202 may have a width W of between about 50 mm and about 350 mm, a height H of between about 200 mm and 400 mm, and a depth D of between about 25 mm and about 300 mm. In some examples the energy absorber 202 may have a width W of between about 80 mm and 140 mm, a height H of between about 250 mm and 300 mm, and a depth D of between about 50 mm and about 250 mm. In some examples, the dimensions (W, H, and/or D) may be larger or smaller than the examples above. Also, in some examples, the width W, height H, and/or depth D may vary from one part of the energy absorber 202 to another. It should be noted that the energy absorber on the opposite lateral side of the vehicle seat may be mirror images of that shown in FIGS. 4 and 5.

The energy absorber 202 includes a base 400 for attachment to the seat and/or vehicle and at least one protrusion 404 extending outward from the base. The energy absorber 202 depicted in FIG. 5 has a flat (or substantially planar) base 400 for attachment to a flat mounting surface of the vehicle. However, in some examples, the proximal fact of base 400 of the energy absorber 202 can be angled or curved to complement the portion of the seat body or vehicle to which it is attached. The energy absorber 202 may include a protrusion or extrusion 404 extending outward from the distal face of the base 400 to an outboard edge 402. The outboard edge 402 may be flat or partially or totally angled to accommodate the likely angle of a side collision. The span between the base 400 and the outboard edge 402 defines an outer wall 404 of the energy absorber. At least a portion of the protrusion or outer wall 404 may be divided into multiple cells 408 by one or more webs or cell walls 410 to form an open cell structure. The energy absorber 202 depicted in FIGS. 4 and 5 has twelve cells 408 that are prismatic having substantially triangular or rectangular outer perimeters. In other words, the cells 408 in this example are triangular or rectangular prisms with the longitudinal ends being open. However, the cells 408 of the energy absorber 202 may have any other perimeter shape or combination of shapes including, for example, a square, triangle, hexagon, octagon, or trapezoid. In the example shown in FIG. 5, the cells 408 of one energy absorber 202 have differing shapes and sizes. In other examples, the cells 408 of one energy absorber may be a generally uniform shape and/or a generally uniform size. The outer wall 404 and/or webs or cell walls 410 that form the cells 408 may have a uniform thickness. In some examples, the outer wall 404 and/or cell walls 410 have a thickness of between about 2 mm and 5 mm. In other examples, the cell walls 410 may have a thickness of between about 0.5 mm and 10 mm. In some examples, the thickness of the outer wall 404 may be the same or different than the cell walls 410. In some examples, the outer wall 404 and/or the cell wall 410 thickness need not be uniform. Also, while the energy absorber 202 depicted in FIG. 5 has twelve cells 408, in some examples, the energy absorber 202 may have more or fewer cells. The energy absorber 202 may have as many cells 408 as allowed by the size, material, and method of manufacturing the energy absorber.

In other example, the energy absorber 202 may be formed of a honeycomb structure formed from an array of hollow cells formed between walls. That is, the cells may comprise prisms having hexagon perimeter or cross-section which may be open ended or closed. In some examples, the hollow cells may have a width W of between about 10 mm and about 30 mm. The honeycomb energy absorber may be formed from any of the materials described above for energy absorber. In some examples, the honeycomb energy absorber is formed from TL091 Aluminum Alloy. In some examples, the outer wall of the honeycomb energy absorber may be curved such that it provides a variety of oblique angles for receiving a side impact. The outer wall may be open to provide an open cell arrangement, or it may have a skin or surface layer covering the open ends of the cells. In some examples, the energy absorber may be formed from injection molded composites. In other examples, the energy absorber 202 may be formed of an open-cell or closed-cell foam material.

Figure 6A:
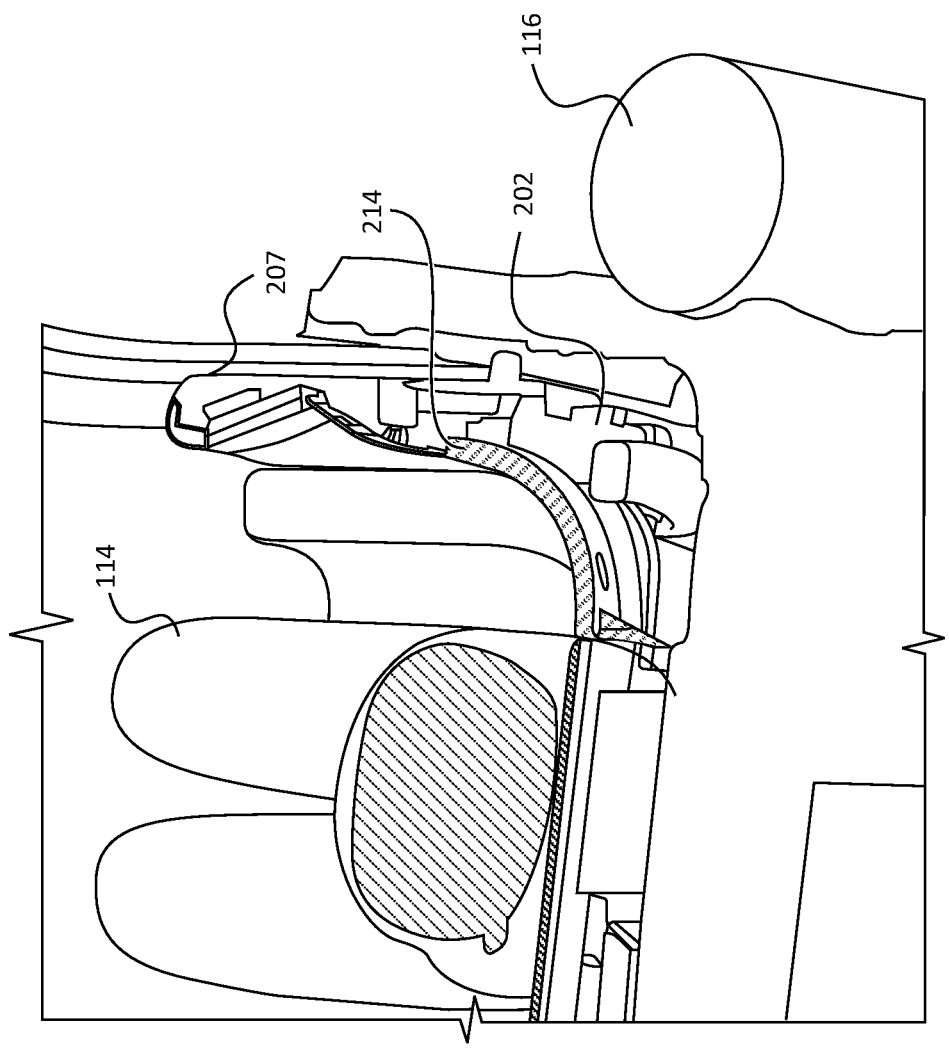
FIG. 6A is a perspective view showing deformation of an example energy absorber of a side-impact crash structure for a vehicle seat during a collision.
Figure 6B:
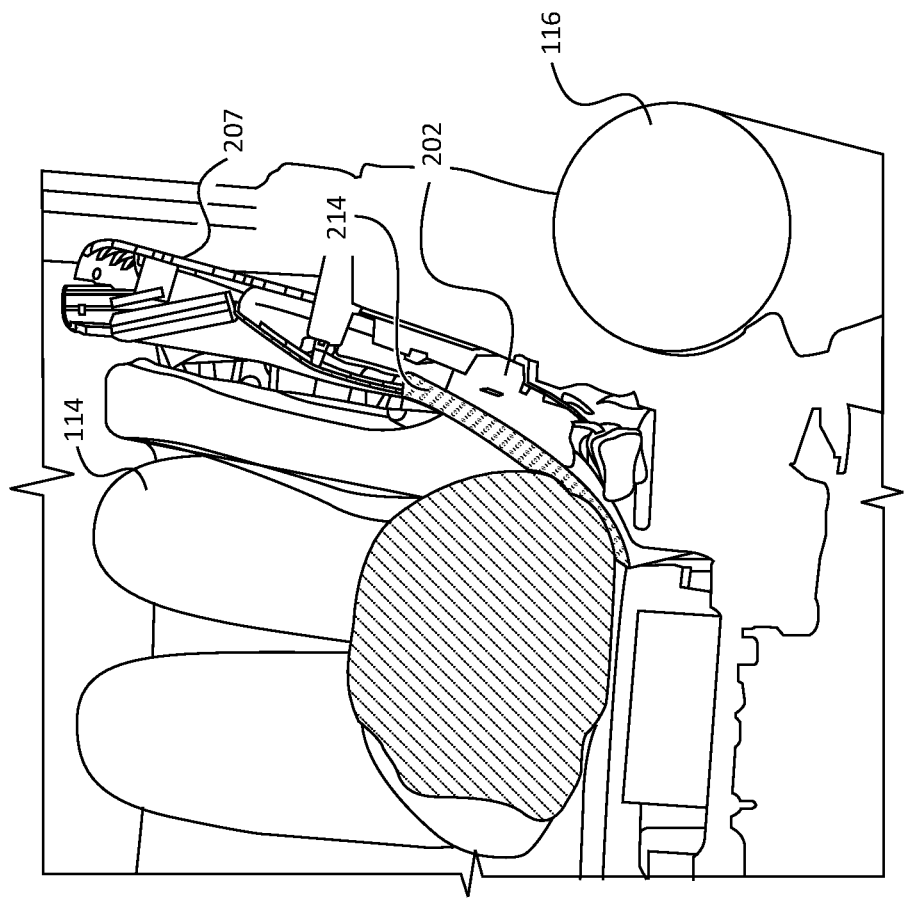
FIG. 6B is a perspective view showing deformation of an example energy absorber of a side-impact crash structure for a vehicle seat during a collision.

As shown in FIGS. 6A and 6B, the energy absorber 202 crushes axially as a result of the side-impact force. In some examples, the cells 408 of the energy absorber 202 may collapse as the energy absorber is subject to a compressive force. The energy absorber 202 absorbs the energy of the impact by collapsing and deforming. The design of the energy absorber 202, including its size, materials, cell structure, shape, and angle are selected to maximize the energy absorbed during the ride-down distance (distance it takes for the vehicle to come to rest after impact) in order to minimize the force applied to occupants 114 seated on the seat surface 208. The force not absorbed by the energy absorber 202 can be spread by one or more load spreaders to additional load paths as describe above.

Figure 7:
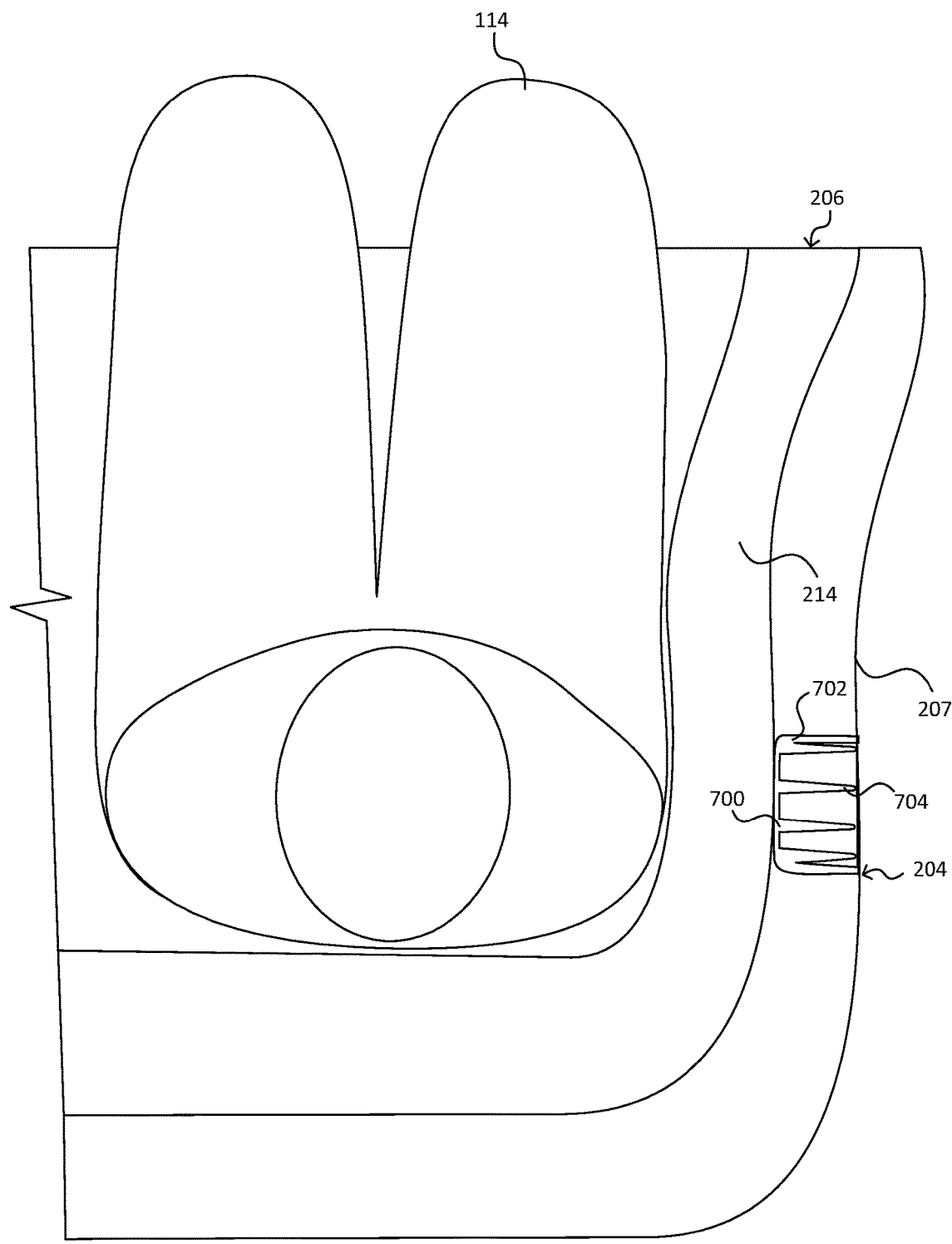
FIG. 7 is an overhead view showing another example energy absorber for side-impact crash structure for a vehicle seat.
Figure 8:
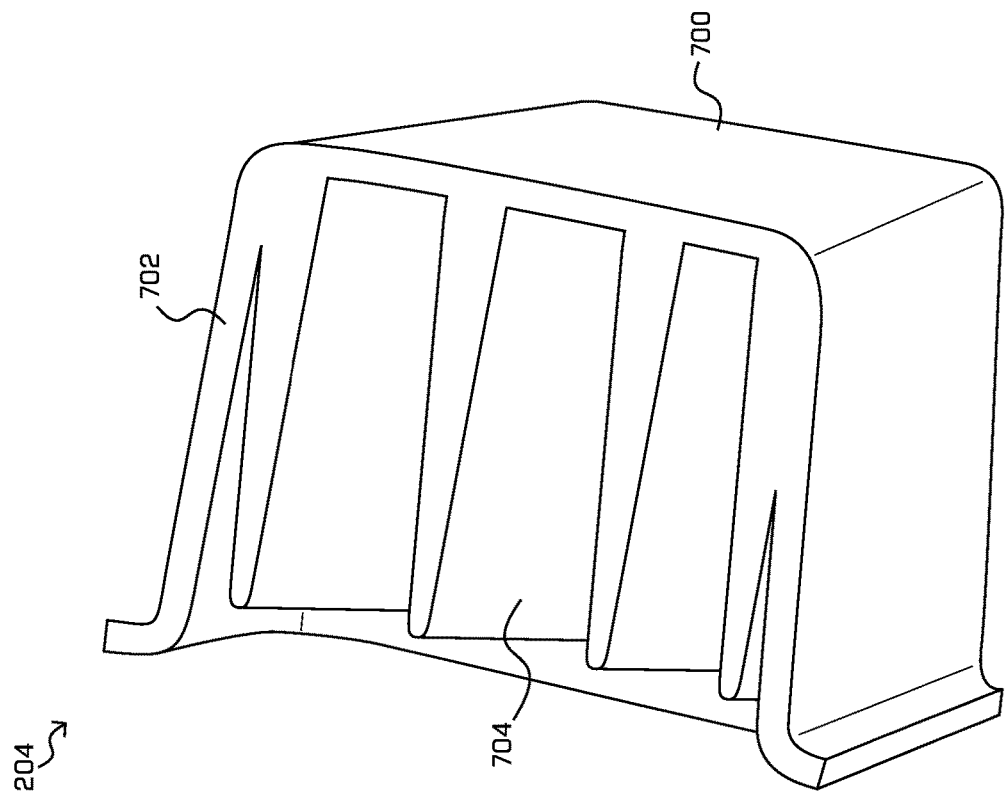
FIG. 8 is a perspective view of the example energy absorber of FIG. 7.

In some examples, the second energy absorber 204 can have the same design and characteristics as the first energy absorber. In other examples, the second energy absorber 204 can be formed from alternative collapsing structures. As shown in FIG. 7, the second energy absorber 204 includes a base coupled to the seat body 206 of a vehicle and a protrusion 702, similar to the energy absorber described above. FIG. 8 shows the energy absorber on its own. Like the first energy absorber 202, the second energy absorber depicted in FIG. 8 includes a base 700 for attachment to the seat and/or vehicle and a protrusion 702 extending outward from the base. The energy absorber 204 may include one or more protrusions or extrusions 702 extending outward from the distal face of the base 700. In an example energy absorber, the protrusion 702 includes one or more ribs 704 extending outward from the distal face of the base 700. The ribs 704 may extend in a direction substantially perpendicular to the distal face of the base 700, as shown in FIGS. 7 and 8. In other examples, the ribs 704 can extend at an angle relative to the distal face of the base 700 to accommodate the likely angle of a side collision. The energy absorber depicted in FIGS. 7 and 8 has four ribs 704 of substantially similar length, shape and thickness. In this example, the ribs 704 each have a first width at the area of the rib proximal the base 700 and a second width at the distal end of rib 704. In other examples, the ribs 704 can each be a substantially uniform width throughout the length of the rib. In other examples, the energy absorber 204 can include ribs of varying widths and shapes. Also, while the energy absorber 204 depicted in FIGS. 7 and 8 has four ribs 404, the energy absorber can have more or fewer ribs. The energy absorber 204 may have as many ribs 704 as allowed by the size, material, and method of manufacturing the energy absorber. In some examples, both the first and second energy absorbers include the above-described rib design.

Figure 9:
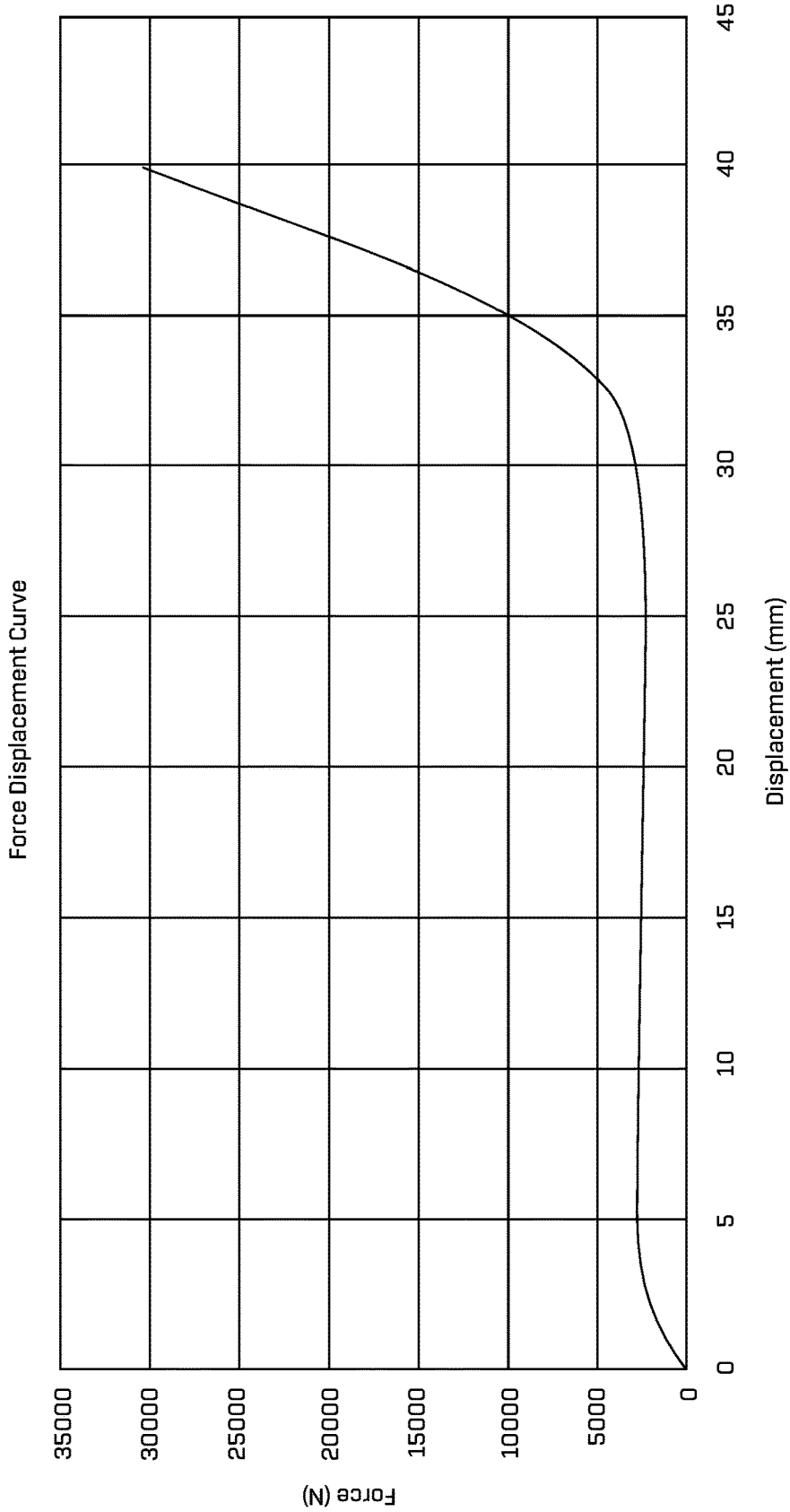
FIG. 9 is a graph showing a force-displacement curve of an example energy absorber of a side-impact crash structure for a vehicle seat.
Figure 10:
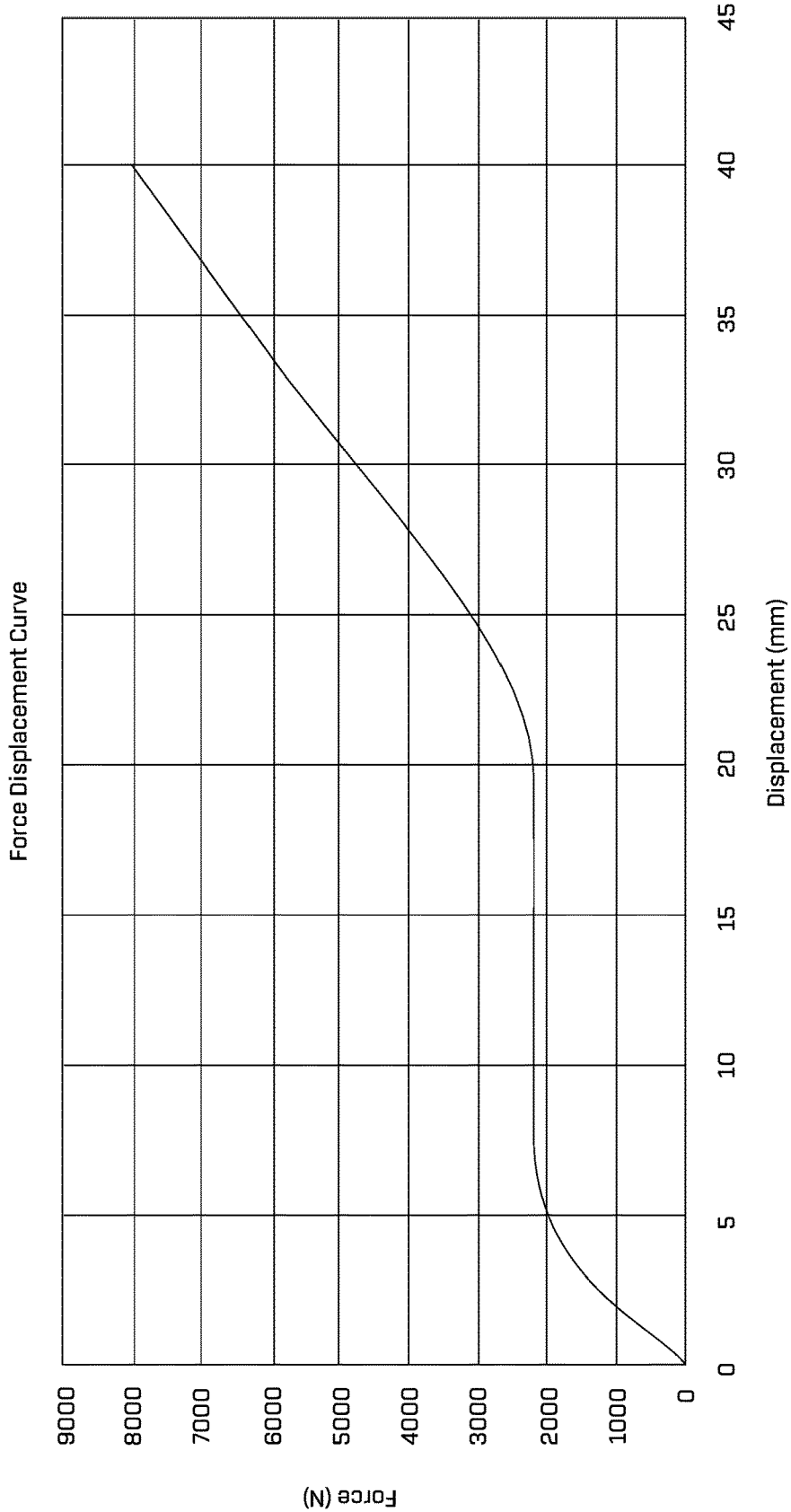
FIG. 10 is a graph showing another force-displacement curve of an example energy absorber of a side-impact crash structure for a vehicle seat.

In some examples, the energy absorbers 202, 204 are the same design formed from the same materials and manufacturing methods such that they have the same material characteristics. In other example, the first energy absorber 202 has a shape and/or materials differ from that of the second energy absorber 204. In such an example, the first and second energy absorbers 202, 204 may plastically deform differently when exposed to the same force or have a different stiffness. FIG. 9 shows a force displacement curve for an example of the first energy absorber 202, which shows the force required to plastically deform the example first energy absorber. FIG. 10 shows a force displacement curve for an example of the second energy absorber 204, which shows the force required to deform the example second energy absorber. In the example depicted in FIGS. 9 and 10, the second energy absorber 204 is less stiff and deforms under a smaller force than the first energy absorber 202. In other examples, the first energy absorber 202 may be less stiff and deforms under a smaller force than the second energy absorber 204. In another example, the first and second energy absorbers 202, 204 may have generally similar force displacement curves.

In general, the crash structures described herein are designed to absorb energy of collision over a relatively short ride-down distance, while minimizing intrusion of a pole or other obstacle into the vehicle seat and onto the passenger. In some examples, energy absorbers described in this application may be designed to absorb energy over the ride-down distance in order to minimize and direct a maximum force transmitted to an occupant while the vehicle is decelerated.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

EXAMPLE CLAUSES

The following paragraphs describe various examples. Any of the examples in this section may be used with any other of the examples in this section and/or any of the other examples or embodiments described herein.

A: In some examples, a vehicle may comprise: a first longitudinal end, a second longitudinal end opposite the first longitudinal end, a first lateral side, and a second lateral side opposite the first lateral side; a passenger compartment positioned between the first longitudinal end and the second longitudinal end, the passenger compartment comprising an outer wall; a seat within the outer wall of the passenger compartment proximate the first longitudinal end and facing toward the second longitudinal end; a first energy absorber disposed between the seat and the outer wall of the passenger compartment, the first energy absorber configured to deform to absorb energy of a collision on the first lateral side, wherein the first energy absorber is positioned to engage with an abdomen area corresponding to a passenger positioned in the seat; and a second energy absorber disposed between the seat and the outer wall of the passenger compartment and configured to deform to absorb energy of a collision on the first lateral side, wherein the second energy absorber is spaced a distance from the first energy absorber to engage with a shoulder area corresponding to the passenger positioned in the seat.

B: The vehicle of example A, wherein the first and second energy absorbers are configured to plastically deform under a compressive force and wherein the second energy absorber plastically deforms under a smaller force than the first energy absorber.

C: The vehicle of example A or B, wherein at least one of the first energy absorber or the second energy absorber comprises a rib extending substantially perpendicular to the first lateral side of the vehicle.

D: The vehicle of any one of examples A-C, wherein the seat further comprises a seat bottom to support the passenger and wherein the first energy absorber is positioned between about 100 mm and 300 mm above the seat bottom and wherein the second energy absorber is positioned between about 450 mm and about 750 mm above the seat bottom.

E: The vehicle of any one of examples A-D, further comprising a third energy absorber and a fourth energy absorber disposed on the second lateral side between the seat and the outer wall of the passenger compartment and configured to absorb energy of a collision with the second lateral side of the vehicle.

F: The vehicle of any one of examples A-E, further comprising a second seat within the outer wall of the passenger compartment and proximate the second longitudinal end and facing toward the first longitudinal end and at least one energy absorber coupled to the second seat.

G: The vehicle of any one of examples A-F, wherein the first energy absorber comprises at least one of aluminum, steel, carbon fiber, or plastic.

H: The vehicle of any one of examples A-G, wherein the first energy absorber comprises an outer wall divided into multiple cells by one or more webs.

I: In some examples, a side-impact crash structure for a vehicle may comprise: a seat comprising an outer shell coupled to a seating surface configured to receive a passenger, the seating surface comprising a seat bottom, a seat back and at least one side wall; and an energy absorber disposed between the outer shell and the at least one side wall of the seat; wherein the energy absorber is positioned to engage with a shoulder area of a passenger positioned in the seat, and wherein the first energy absorber is configured to plastically deform under a compressive force.

J: The side-impact crash structure of example I, wherein the energy absorber is positioned between about 450 mm and about 750 mm above the seat bottom.

K: The side-impact crash structure of example I or J, wherein the energy absorber is a first energy absorber, the side-impact crash structure further comprising a second energy absorber disposed between the outer shell and the seating surface, wherein the second energy absorber is positioned below the first energy absorber to engage with an abdomen area of a passenger positioned in the seat.

L: The side-impact crash structure of example K, wherein the second energy absorber is positioned in between the first energy absorber and the seat bottom.

M: The side-impact crash structure of example K or L, wherein the second energy absorber is positioned between about 100 mm and 300 mm from the seat bottom.

N: The side-impact crash structure of any one of examples K-M, wherein a first compressive force required to plastically deform the first energy absorber is less than a second compressive force required to plastically deform the second energy absorber.

O: The side-impact crash structure of any one of examples K-N, wherein a portion of at least one of the first energy absorber or second energy absorber comprises an open-cell structure or honeycomb structure.

P: The side-impact crash structure of any one of examples I-O, wherein the energy absorber has a width parallel to a direction of travel of the vehicle and wherein the width of the energy absorber is between about 80 mm and 140 mm.

Q: In some examples, a seat may comprise: a seat bottom, a seat back and at least one side wall, a first and second energy absorber disposed in the at least one sidewall; wherein the first and second energy absorbers plastically deform under a compressive force; and wherein the first energy absorber is positioned a distance apart from the second energy absorber.

R: The seat of example Q, wherein at least one of the first energy absorber or second energy absorber has a depth of between about 50 mm and about 100 mm.

S: The seat of example Q or R, wherein at least one of the first energy absorber or second energy absorber comprises: a circumferential wall defining a perimeter of the energy absorber; and a first web disposed within the circumferential wall that divides the energy absorber into multiple cells; wherein a cell of the multiple cells is generally prismatic in shape and has a perimeter shape that is substantially square, rectangular, triangular, hexagonal, octagonal, or trapezoidal.

T: The seat of any one of examples Q-S, wherein at least one of the first energy absorber or second energy absorber comprises: a rib extending substantially perpendicular to a base of the energy absorber; wherein the rib has a first width at the proximal end and a second width at the distal end; and wherein the first width is larger than the second width.

While the example clauses described above are described with respect to particular implementations, it should be understood that, in the context of this document, the content of the example clauses may also be implemented using other methods, devices, systems, and/or other implementations.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described.

What is claimed is:

1. A vehicle comprising:
   a first longitudinal end, a second longitudinal end opposite the first longitudinal end, a first lateral side, and a second lateral side opposite the first lateral side;
   a passenger compartment positioned between the first longitudinal end and the second longitudinal end, the passenger compartment comprising an outer wall;
   a seat within the outer wall of the passenger compartment proximate the first longitudinal end and facing toward the second longitudinal end;
   an airbag disposed on the first lateral side of the seat at a first height above a seating surface;
   a first energy absorber disposed on the first lateral side of the seat between the seat and the outer wall of the passenger compartment, the first energy absorber configured to deform to absorb energy of a collision on the first lateral side, wherein the first energy absorber is disposed at a second height spaced a distance above the airbag and is positioned to engage with an abdomen area corresponding to a passenger positioned in the seat; and
   a second energy absorber disposed on the first lateral side of the seat between the seat and the outer wall of the passenger compartment and configured to deform to absorb energy of a collision on the first lateral side, wherein the second energy absorber is disposed at a third height spaced a distance above the first energy absorber to engage with a shoulder area corresponding to the passenger positioned in the seat.

2. The vehicle of claim 1, wherein the first and second energy absorbers are configured to plastically deform under a compressive force and wherein the second energy absorber plastically deforms under a smaller force than the first energy absorber.

3. The vehicle of claim 1, wherein at least one of the first energy absorber or the second energy absorber comprises a rib extending substantially perpendicular to the first lateral side of the vehicle.

4. The vehicle of claim 1, wherein the seat further comprises a seat bottom to support the passenger and wherein the first energy absorber is positioned between about 100 mm and 300 mm above the seat bottom and wherein the second energy absorber is positioned between about 450 mm and about 750 mm above the seat bottom.

5. The vehicle of claim 1, further comprising a third energy absorber and a fourth energy absorber disposed on the second lateral side between the seat and the outer wall of the passenger compartment and configured to absorb energy of a collision with the second lateral side of the vehicle.

6. The vehicle of claim 1, wherein the first energy absorber comprises at least one of aluminum, steel, carbon fiber, or plastic.

7. The vehicle of claim 1, wherein the first energy absorber comprises an outer wall divided into multiple cells by one or more webs.

8. A side-impact crash structure for a vehicle comprising:
a seat comprising a seat bottom having a seating surface and a seatback having a back supporting surface and a lateral side connected to the back supporting surface and extending upwardly from a lateral side of the seat bottom, wherein the seat bottom, the seatback, and the lateral side of the seatback configured to receive a passenger, the lateral side of the seatback having a supporting surface connected to the back supporting surface of the seatback, wherein the seatback and lateral side of the seatback have a hollow interior formed by the back supporting surface of the seatback and the supporting surface of the lateral side and an outer shell coupled to the back supporting surface of the seatback and the supporting surface of the lateral side of the seatback; and
an energy absorber disposed between the outer shell and the supporting surface of the lateral side of the seatback;
wherein the energy absorber is positioned to engage with a shoulder area of a passenger positioned in the seat, and
wherein the energy absorber is configured to plastically deform under a compressive force.

9. The side-impact crash structure of claim 8, wherein the energy absorber is positioned between about 450 mm and about 750 mm above the seat bottom.

10. The side-impact crash structure of claim 8, wherein the energy absorber is a first energy absorber, the side-impact crash structure further comprising a second energy absorber disposed between the outer shell and the lateral sidewall of the seatback, wherein the second energy absorber is positioned below the first energy absorber to engage with an abdomen area of a passenger positioned in the seat.

11. The side-impact crash structure of claim 10, wherein the second energy absorber is positioned in between the first energy absorber and the seat bottom.

12. The side-impact crash structure of claim 10, wherein the second energy absorber is positioned between about 100 mm and 300 mm from the seat bottom.

13. The side-impact crash structure of claim 10, wherein a first compressive force required to plastically deform the first energy absorber is less than a second compressive force required to plastically deform the second energy absorber.

14. The side-impact crash structure of claim 8, wherein the energy absorber has a width parallel to a direction of travel of the vehicle and wherein the width of the energy absorber is between about 80 mm and 140 mm.

15. A seat comprising:
a seat bottom having a seating surface and a seat-back having a back supporting surface and a lateral side-wall having a supporting surface connected to the back supporting surface and extending upwardly from a lateral side of the seat bottom, wherein the seat bottom, the seatback, and the lateral sidewall are configured to receive a passenger, wherein the seatback and the lateral sidewall of the seatback have a hollow interior formed by the back supporting surface of the seatback and the supporting surface of the lateral sidewall and an outer shell coupled to the back supporting surface of the seatback and the supporting surface of the lateral sidewall of the seatback;
a first energy absorber and a second energy absorber disposed between the lateral sidewall and the outer shell of the seat;
wherein the first energy absorber and the second energy absorber are configured to plastically deform under a compressive force; and
wherein the first energy absorber is positioned a distance apart from the second energy absorber.

16. The seat of claim 15, wherein at least one of the first energy absorber or the second energy absorber has a depth of between about 50 mm and about 100 mm.

17. The seat of claim 15, wherein at least one of the first energy absorber or the second energy absorber comprises:
a circumferential wall defining a perimeter of the energy absorber; and
a first web disposed within the circumferential wall that divides the energy absorber into multiple cells;
wherein a cell of the multiple cells is generally prismatic in shape and has a perimeter shape that is substantially square, rectangular, triangular, hexagonal, octagonal, or trapezoidal.

18. The seat of claim 15, wherein at least one of the first energy absorber or the second energy absorber comprises:
a rib extending substantially perpendicular to a base of the energy absorber;
wherein the rib has a first width at a proximal end and a second width at a distal end; and
wherein the first width is larger than the second width.

19. The vehicle of claim 1, wherein the first energy absorber is located between the seat and a body portion of the vehicle.

20. The vehicle of claim 1, wherein the first energy absorber is disposed in a space between an outer shell and at least one side wall of the seat.

* * * * *